United States Patent
Knapp

(10) Patent No.: US 10,323,328 B2
(45) Date of Patent: Jun. 18, 2019

(54) METHOD FOR PRODUCING HYDROGEN GAS FROM AQUEOUS HYDROGEN SULPHIDE

(71) Applicant: BIO-H2-GEN INC., Kingston (CA)

(72) Inventor: William Charles Knapp, Kingston (CA)

(73) Assignee: BIO-H2-GEN INC., Kingston, Ontario (CA)

( * ) Notice: Subject to any disclaimer, the term of this patent is extended or adjusted under 35 U.S.C. 154(b) by 38 days.

(21) Appl. No.: 15/578,840

(22) PCT Filed: Jun. 20, 2016

(86) PCT No.: PCT/CA2016/050720
§ 371 (c)(1),
(2) Date: Dec. 1, 2017

(87) PCT Pub. No.: WO2016/201585
PCT Pub. Date: Dec. 22, 2016

(65) Prior Publication Data
US 2018/0179646 A1    Jun. 28, 2018

Related U.S. Application Data

(60) Provisional application No. 62/181,800, filed on Jun. 19, 2015.

(51) Int. Cl.
*C25B 1/02*    (2006.01)
*C25B 1/04*    (2006.01)
(Continued)

(52) U.S. Cl.
CPC ............ *C25B 1/02* (2013.01); *B01D 53/00* (2013.01); *C01B 3/50* (2013.01); *C02F 1/4676* (2013.01);
(Continued)

(58) Field of Classification Search
CPC ................ C25B 15/00–08; C25B 1/02–12
See application file for complete search history.

(56) References Cited

U.S. PATENT DOCUMENTS 3,249,522 A    5/1966    Bolmer
3,409,520 A    11/1968   Bolmer
(Continued)

FOREIGN PATENT DOCUMENTS

CA    1099896    4/1981
CA    1185416    4/1985
(Continued)

OTHER PUBLICATIONS

Gercel et al., Removal of Hydrogen Sulfide by electrochemical method with a batchwise operation. Separation and Purification Technology. 62:654-658, 2008.
(Continued)

*Primary Examiner* — Brian W Cohen
(74) *Attorney, Agent, or Firm* — Bereskin & Parr LLP/S.E.N.C.R.L., s.r.l.; Michael Fenwick

(57) ABSTRACT

The present disclosure relates to a method for producing hydrogen by electrolysing an aqueous hydrogen sulphide solution. The products of the electrolysis process are then subjected to a magnetic field to separate them into various product streams.

19 Claims, 6 Drawing Sheets

(51) Int. Cl.

| | | |
|---|---|---|
| *C25B 11/02* | (2006.01) | |
| *B01D 53/00* | (2006.01) | |
| *C01B 3/50* | (2006.01) | |
| *C25B 9/06* | (2006.01) | |
| *C02F 1/461* | (2006.01) | |
| *C02F 1/467* | (2006.01) | |
| *C02F 1/48* | (2006.01) | |
| *C02F 103/08* | (2006.01) | |
| *C02F 3/28* | (2006.01) | |
| *C02F 101/10* | (2006.01) | |

(52) U.S. Cl.
CPC ............ *C02F 1/46109* (2013.01); *C02F 1/48* (2013.01); *C25B 9/06* (2013.01); *C25B 11/02* (2013.01); *B01D 2256/16* (2013.01); *C02F 1/461* (2013.01); *C02F 3/28* (2013.01); *C02F 2001/46152* (2013.01); *C02F 2101/101* (2013.01); *C02F 2103/08* (2013.01)

(56) References Cited

U.S. PATENT DOCUMENTS

| | | | |
|---|---|---|---|
| 3,423,180 A | 1/1969 | Hoekstra | |
| 3,471,254 A | 10/1969 | Urban | |
| 3,594,125 A | 7/1971 | Hamblin | |
| 3,701,824 A | 10/1972 | Prahacs et al. | |
| 4,014,777 A * | 3/1977 | Brown ................ | B23K 7/08 |
| | | | 204/228.5 |
| 4,765,873 A | 8/1988 | Chang et al. | |
| 5,019,227 A | 5/1991 | White | |
| 5,431,877 A | 7/1995 | Brucken et al. | |
| 5,578,189 A | 11/1996 | Joshi | |
| 5,624,545 A | 4/1997 | Landfors et al. | |
| 5,908,545 A | 6/1999 | Donini et al. | |
| 6,241,871 B1 | 6/2001 | Donini | |
| 6,783,687 B2 | 8/2004 | Richard | |
| 7,378,068 B2 | 5/2008 | Mao et al. | |
| 2012/0217156 A1 | 8/2012 | Nakazawa et al. | |
| 2012/0267252 A1 | 10/2012 | Chae et al. | |
| 2012/0268134 A1 | 10/2012 | Lafitte et al. | |
| 2012/0269694 A1 | 10/2012 | Zheng et al. | |
| 2012/0270121 A1 | 10/2012 | Nakajima et al. | |
| 2013/0056355 A1 | 3/2013 | Hou | |

FOREIGN PATENT DOCUMENTS

| | | |
|---|---|---|
| CA | 1185768 | 4/1985 |
| CA | 1185917 | 4/1985 |
| CA | 1198838 | 12/1985 |
| CA | 1210168 | 8/1986 |
| CA | 1254505 | 5/1989 |
| CA | 2058296 | 6/1990 |
| CA | 2024525 | 9/1990 |
| CA | 1333103 | 2/1994 |
| CA | 2116289 | 2/1994 |
| CA | 2253161 | 10/1998 |
| CA | 2153669 | 2/1999 |
| CA | 2334262 | 5/1999 |
| CA | 2312058 | 6/2000 |
| CA | 2012266 | 9/2001 |
| CA | 2282233 | 2/2003 |
| CA | 2514432 | 1/2004 |
| CA | 2355346 | 7/2004 |
| CA | 2111274 | 1/2005 |
| CA | 2628004 | 11/2006 |
| CA | 2590437 | 5/2007 |
| CA | 2654587 | 6/2007 |
| CA | 2660791 | 8/2007 |
| CA | 2225223 | 3/2009 |
| CA | 2309422 | 9/2009 |
| CA | 2684595 | 11/2009 |
| CA | 2688610 | 12/2009 |
| CA | 2703464 | 5/2010 |
| CA | 2764913 | 6/2010 |
| CA | 2709722 | 7/2010 |
| CA | 2779509 | 11/2010 |
| CA | 2725648 | 12/2010 |
| CA | 2754329 | 10/2011 |
| CA | 2565604 | 1/2012 |

OTHER PUBLICATIONS

Pikaar et al. Electrochemical sulfide oxidation from domestic wastewater using mixed metal-coated titanium electrodes. Water Research. 45:5381-5388, 2011.

Quraishi et al. The effect of magnetic fields on natural convective mass transport at inclined circular disk electrodes. Electrochimica Acta, 25:591-599, 1980.

Petrov, K. et al. An assessment of electrolytic hydrogen production from H2S in Black Sea waters. International Journal of Hydrogen Energy 36:8936-8942, 2011.

* cited by examiner ly, the source of aqueous hydrogen sulphide is municipal sewage or wastewater, wherein the municipal sewage or wastewater is treated using the method of the present disclosure to reduce or deplete the amount of hydrogen sulphide in the wastewater.

METHOD FOR PRODUCING HYDROGEN GAS FROM AQUEOUS HYDROGEN SULPHIDE

CROSS REFERENCE TO RELATED APPLICATIONS

This is a national stage application of PCT/CA2016/050720, filed Jun. 20, 2016, which claims priority from U.S. Provisional patent application Ser. No. 62/181,800, filed Jun. 19, 2015, all of which are incorporated herein by reference in their entirety.

FIELD

The present disclosure relates to a method for producing hydrogen gas from aqueous hydrogen sulphide. In particular, the present disclosure relates to a method for producing hydrogen gas from aqueous hydrogen sulphide comprising subjecting the aqueous hydrogen sulphide to electrolysis and exposing the electrolysis products to an established linear or a spiral-shaped magnetic field flux to facilitate the separation of the products.

INTRODUCTION

Currently, most industrial scale hydrogen gas production depends on the extraction of hydrogen gas, by the oil and gas industries, using the thermal energy in 1000° C. steam to break the C—H bond in methane ($CH_4$). In addition to producing hydrogen gas ($H_2$), this process also produces $CO_2$, a greenhouse gas (GHG). Accordingly, current processes for the production of hydrogen gas are both energy intensive and polluting to the environment.

SUMMARY

The present disclosure relates to a method for producing hydrogen gas from aqueous hydrogen sulphide comprising subjecting a continuous stream of aqueous hydrogen sulphide to electrolysis and subsequently exposing the electrolysis product to an arranged magnetic flux to facilitate the separation of such products.

Accordingly, in one embodiment, there is included a method of producing hydrogen has from aqueous hydrogen sulphide, comprising the steps of
providing a source of aqueous hydrogen sulphide;
subjecting the aqueous hydrogen sulphide to electrolysis thereby producing electrolysis products, wherein the electrolysis products comprise hydrogen gas; and
subjecting the electrolysis products to a magnetic field to facilitate the separation of the electrolysis products.

In one embodiment, the source of aqueous hydrogen sulphide comprises wastewater, or sewage water. In one embodiment, the source of aqueous hydrogen sulphide is municipal sewage or wastewater, wherein the municipal sewage or wastewater is treated using the method of the present disclosure to reduce or deplete the amount of hydrogen sulphide in the wastewater.

In another embodiment, there is further provided an electrode for the electrolysis of the aqueous hydrogen sulphide, wherein the electrode comprises an anode and a cathode. In one embodiment, the anode and cathode of the electrode is helically or vertically arranged.

Other features and advantages of the present application will become apparent from the following detailed description. It should be understood, however, that the detailed description and the specific examples while indicating preferred embodiments of the application are given by way of illustration only, since various changes and modifications within the spirit and scope of the application will become apparent to those skilled in the art from this detailed description.

DRAWINGS

The disclosure will now be described in greater detail with reference to the following drawings in which.

DESCRIPTION OF VARIOUS EMBODIMENTS (I) Definitions

Figure 1A:
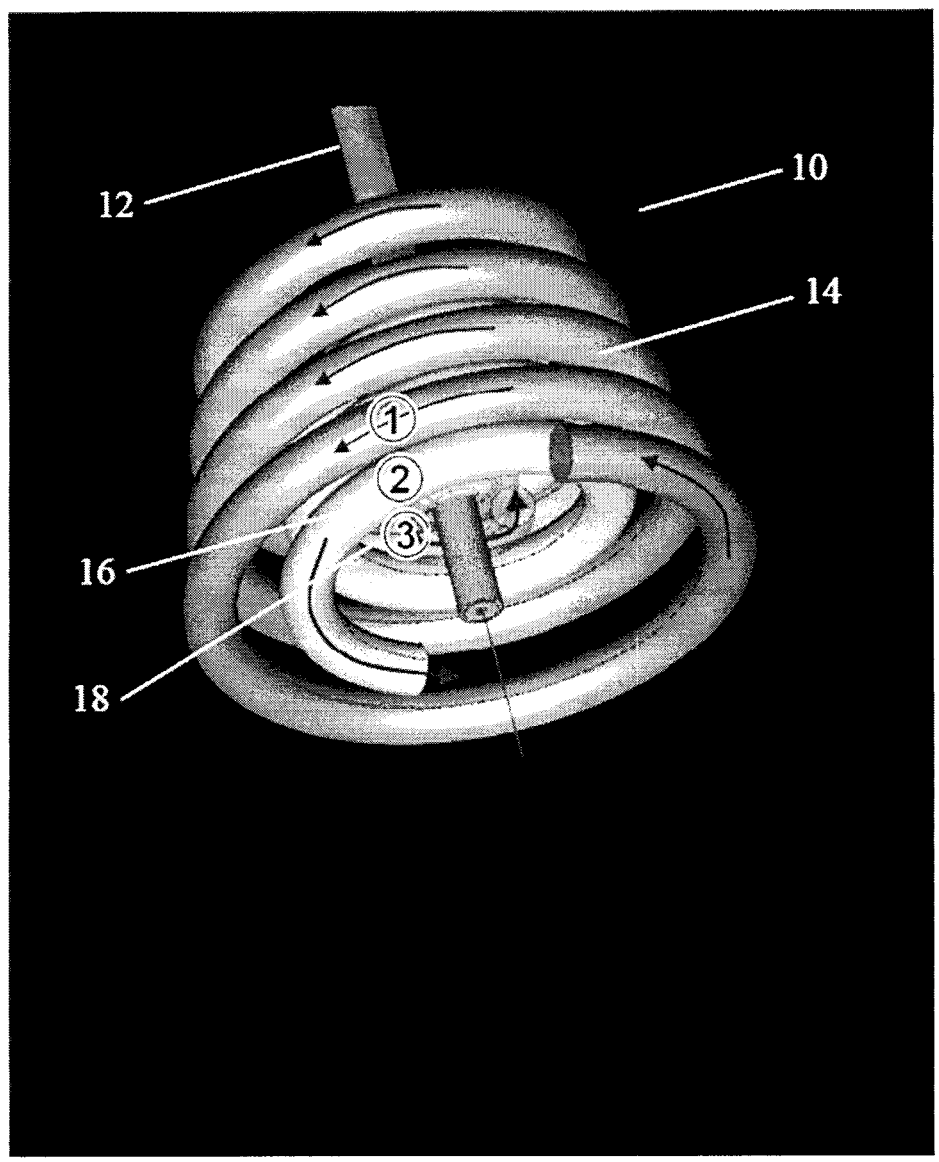
FIGS. 1A and 1B are schematic representations of an electrode and a magnet in embodiments for performing the method of the disclosure.
Figure 1B:
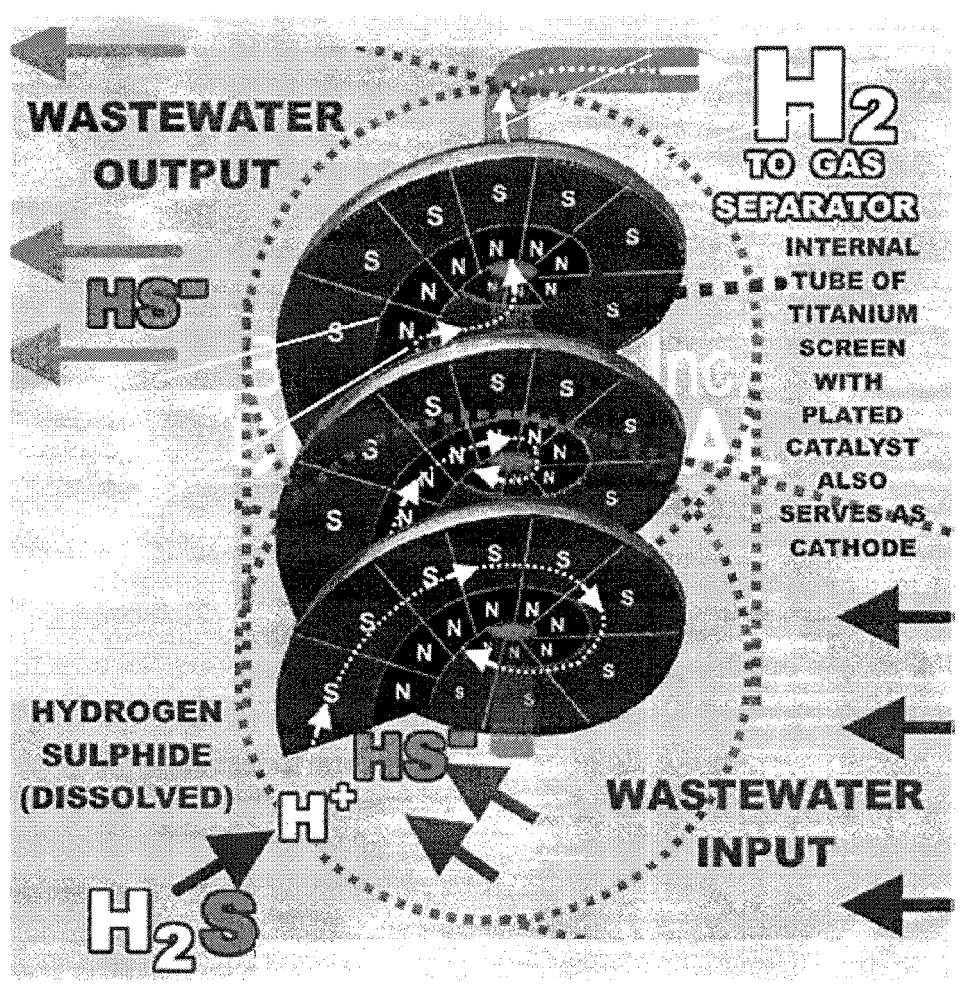

The term "aqueous hydrogen sulphide" as used herein refers to a solution of hydrogen sulphide ($H_2S$) in water. The water may be from any source, including, for example, wastewater, sewage water, seawater, in which hydrogen sulphide is dissolved. The hydrogen sulphide may be present as a result of natural processes, such as anaerobic conditions in wastewater in which anaerobic sulphate reducing bacteria (SRB) produce hydrogen sulphide. Alternatively, the aqueous hydrogen sulphide may be intentionally generated, for example, by treating seawater containing sodium sulfate with anaerobic (SRB) bacteria in an anaerobic environment to produce aqueous hydrogen sulphide.

The term "electrolysis," as used herein, refers to the use of an electric current to drive an otherwise non-spontaneous chemical reaction, the redox reaction of hydrogen sulphide.

The term "electrolysis products" as used herein refers to any products generated as a result of the electrolysis of aqueous hydrogen sulphide, including, but not limited to, hydrogen gas ($H_2$) and bisulphide ions ($HS^-$).

The term "magnetic field" as used herein refers to the region in space surrounding a magnetic body or entity, such as a permanent neodymium magnet or a conductor carrying a current, where an appreciable magnetic force is present. Such a field is represented by magnetic lines of force. In an electromagnetic field, for example, the magnetic field is perpendicular to the electrical field.

The term "helical" and "helix" as used herein refers to a helical shape and includes any helix or similar pattern that is disposed about the circumference of a cone, or similar structure at a substantially constant angle to a longitudinal axis of the structure.

The term "vortical" as used herein refers to a shape or flow that is generally similar to a vortex in that it proceeds in a generally circular configuration.

The term "vortex" as used herein is a broad term, and is to be given its ordinary and customary meaning to a person of ordinary skill in the art (and it is not to be limited to a special or customized meaning), and refers without limitation to a spinning flow of fluid or a spiral motion of fluid with closed streamlines.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

(II) Method of the Disclosure

The present disclosure relates to a method for producing hydrogen gas from the electrolysis of aqueous hydrogen sulphide. Aqueous hydrogen sulphide, generated for example by anaerobic bacteria in municipal wastewater or sewage water is subjected to hydrolysis to form electrolysis products including, but not limited to, hydrogen gas and other hydrogen species (such as hydrogen ions), and bisulphide ions (HS). In addition, the method results in a residual aqueous stream which is reduced or free from hydrogen sulphide. The electrolysis products are, either simultaneously or independently, exposed to a magnetic field which, in one embodiment, facilitates the separation of the electrolysis products.

Accordingly, in one embodiment of the disclosure, there is included a method for producing hydrogen gas from aqueous hydrogen sulphide, comprising the steps of:
  providing a source of aqueous hydrogen sulphide;
  subjecting the aqueous hydrogen sulphide to electrolysis thereby producing electrolysis products, wherein the electrolysis products comprise hydrogen gas; and
  subjecting the electrolysis products to a magnetic field to facilitate the separation of the electrolysis products.

In another embodiment of the disclosure, the source of aqueous hydrogen sulphide is any water source which, naturally or intentionally, contains dissolved hydrogen sulphide. In one embodiment, the source of aqueous hydrogen sulphide is wastewater, and/or sewage water. In another embodiment, the source of aqueous hydrogen sulphide is any water source which contains suitable precursors for the generation of hydrogen sulphide. For example, seawater naturally contains approximately 7.7% of sodium sulphate ($NaSO_4$). Under anaerobic conditions, anaerobic bacteria obtain oxygen from the sodium sulphate generating hydrogen sulphide as waste. Accordingly, in one embodiment, the source of hydrogen sulphide is natural seawater which has undergone respiration by anaerobic (SRB) bacteria. Examples of anaerobic (SRB) bacteria include, but are not limited to, Desulfovibrio desulfuricans etc.

In another embodiment of the disclosure, the electrolysis products comprise hydrogen gas ($H_2$) and bisulphide ions ($HS^-$). In another embodiment, the electrolysis products further comprise other hydrogen species such as hydrogen ions ($H^+$).

In another embodiment of the disclosure, the magnetic field facilitates the separation of the electrolysis products into separate continuous streams, for example, three separate streams. In one embodiment, the magnetic field facilitates the separation of the electrolysis products into three separate streams comprising a hydrogen species stream, a bisulphide ion stream and a residual aqueous stream. In one embodiment, the hydrogen species stream comprises hydrogen gas ($H_2$). In another embodiment, the hydrogen species stream further comprises hydrogen ions ($H^+$).

In one embodiment, the residual aqueous stream is reduced in, or free from, hydrogen sulphide.

In another embodiment of the disclosure, the electrolysis of the aqueous hydrogen sulphide and subjecting the electrolysis products to a magnetic field occur concurrently or independently.

In another embodiment, the method of the disclosure further provides an electrode for the electrolysis of the aqueous hydrogen sulphide, wherein the electrode comprises an anode and a cathode. In one embodiment, the anode and the cathode are helically or vertically arranged. In another embodiment, the anode is helically arranged and the cathode forms a central longitudinal member disposed within the helically or vertically arranged anode.

In another embodiment, the method further provides a helically or vertically arranged magnet, or series of magnets forming a helix or vortex, thereby providing the magnetic field to facilitate the separation of the electrolysis products.

In one embodiment, the helically or vertically arranged anode is disposed within the helically or vertically arranged magnet or series of magnets, and further, wherein the cathode forms a central longitudinal member disposed within the helically or vertically arranged anode and magnet(s). In another embodiment, the helically or vertically arranged anode and cathode is disposed within the helically or vertically arranged magnet(s).

In one embodiment, the hydrogen gas is produced in a continuous flowing stream by means of inducing a helical or vortex flow profile to facilitate both the separation of the composite ion streams in addition to facilitating the separation of particulates or gaseous bubbles. In one embodiment, the method is continuous.

In another embodiment of the disclosure, the method includes vortically flowing the aqueous hydrogen sulphide through the electrode and magnet. In one embodiment, the aqueous hydrogen sulphide is vortically flowed through the helically or vertically arranged anode and helically or vortically arranged magnet(s).

In one embodiment, the production of hydrogen gas using the method of the disclosure is zero-carbon hydrogen gas in a distributed manner and available for immediate usage; it does not require transport by truck, rail or pipeline.

With reference now to FIG. 1A, shown, in one embodiment, is a vortically flowing aqueous hydrogen sulphide stream 10 with a centrally disposed longitudinal cathode 12, and a helically arranged anode and helically arranged array of magnets (not shown). The vortically flowing outer layer 14 is the residual aqueous stream in which the hydrogen sulphide has been reduced or removed. Vortically flowing layer 16 comprises negatively charged electrolysis products, such as bisulfide ions ($HS^-$), which are attracted to the positive magnetic field flux as a result of the helical array of magnets. Vortically flowing layer 18 comprises the positively charged electrolysis products which are attracted to the negative magnetic field flux as a result of the helical array of magnets. Layer 18 is adjacent to the cathode 12 where the hydrogen ions ($H^+$) formed during the electrolysis process are reduced at the cathode 18 to form hydrogen gas. In one embodiment, the vortical flow of the aqueous hydrogen sulphide also facilitates the separation of the hydrogen gas as a result of centripetal forces acting upon the hydrogen gas particles.

In another embodiment of the disclosure, the method further comprises applying a direct current across the anode and cathode so as to cause a current flow through the aqueous hydrogen sulphide to cause the electrolysis of the hydrogen sulphide. In another embodiment, hydrogen gas or hydrogen ions form at the cathode and bisulphide ion forms at the anode. In one embodiment, the direct current comprises a voltage and amperage sufficient for the electrolysis of the hydrogen sulphide. It will be understood that the source of aqueous hydrogen sulphide further comprises electrolytes, such as dissolved salts, acids and/or bases or other charged species in the water, such that an electrical charge is conducted through the aqueous hydrogen sulphide as a result of the charge being applied to the electrode.

Figure 2:
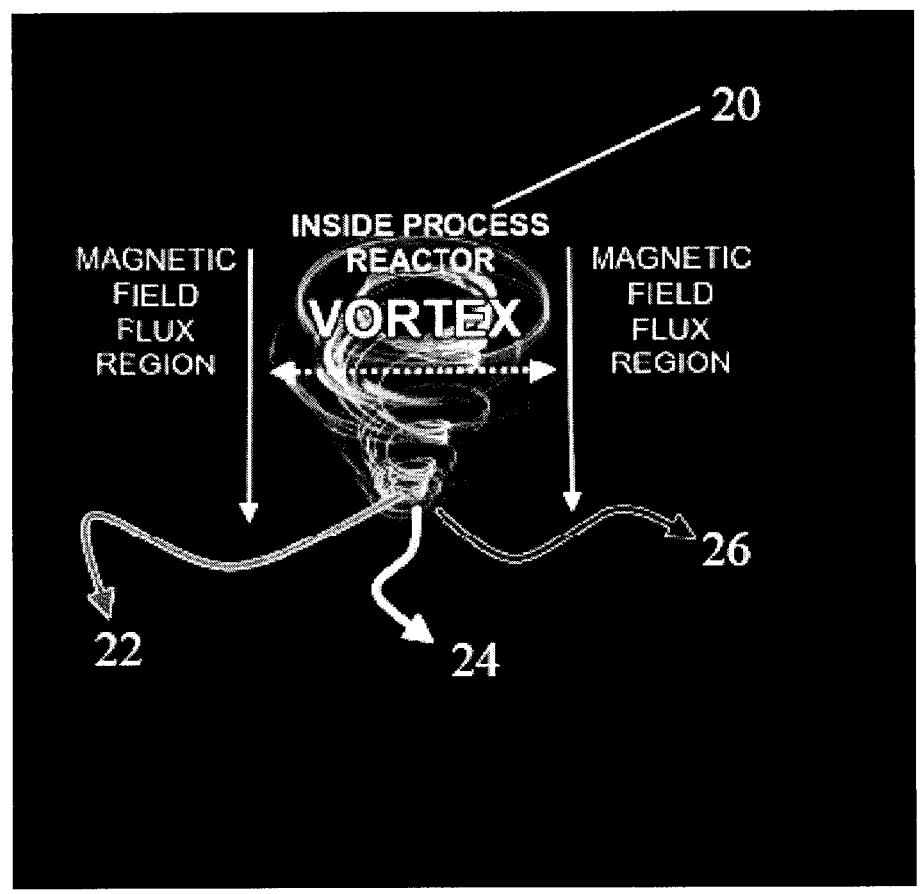
FIG. 2 is a schematic representation showing a method of the disclosure.

With reference now to FIG. 2, shown in one embodiment, is a vortically flowing source of aqueous hydrogen sulphide 20 inside the process reactor containing the anode, cathode and magnets (now shown). The vortically flowing aqueous hydrogen sulphide 20 is exposed to a direct current inside the process reactor sufficient for the electrolysis of the hydrogen sulphide to form the electrolysis products. Stream 22 comprises the residual aqueous stream in which the hydrogen sulphide has been reduced or removed. Stream 24 comprises the negatively charged electrolysis products, including bisulphide ions ($HS^-$), while stream 26 comprises the positively charged electrolysis products including hydrogen ions ($H^+$) and hydrogen gas. The magnetic field facilitates the separation of the electrolysis products due to the charged nature of the electrolysis products, wherein the charged products are attracted in the magnetic field to the opposite charge (positively charged ions are attracted to the negative pole of the magnetic field and negatively charged ions are attracted to the positive pole of the magnetic field).

In one embodiment, wherein the magnet is a rare earth magnet or an electro-magnet. In another embodiment, the rare earth magnet is a neodymium or samarium magnet. In another embodiment, the neodymium magnet is an N52 neodymium magnet.

In another embodiment of the disclosure, the bisulphide stream is converted to aqueous hydrogen sulphide and recycled as a source of hydrogen sulphide. The bisulphide stream is collected and directed to a separate process stream whereby mixing with air (oxygen) forms sulphur dioxide:

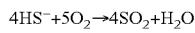

$$4HS^- + 5O_2 \rightarrow 4SO_2 + H_2O$$

Sulphur dioxide is then converted to sulphur trioxide and subsequently combined with iron oxide (FeO) to form iron sulphate ($FeSO_4$). The iron sulphate is then directed to an anaerobic tank and subjected to sulphate reducing bacteria which extract oxygen from the sulphate ion to produce aqueous hydrogen sulphide. In one embodiment, the aqueous hydrogen sulphide is recycled to as a source of aqueous hydrogen sulphide.

In another embodiment, the residual aqueous stream, with hydrogen sulphide removed or reduced, is returned to the wastewater source for further treatment.

Figure 3A:
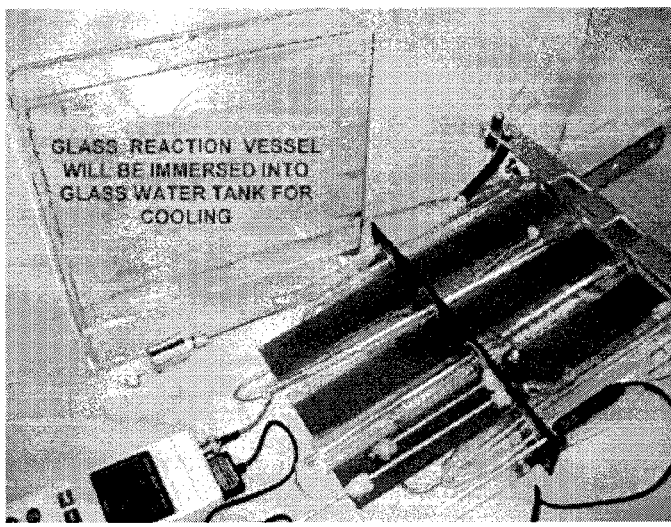
FIGS. 3A and 3B is a photo showing a twinned glass apparatus for conducting a method of the disclosure in a batch and stationary experiment.
Figure 3B:
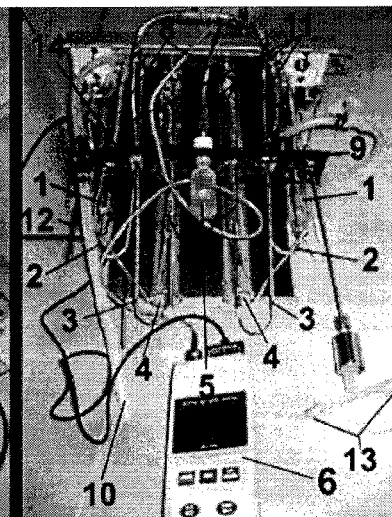

FIG. 3 shows a twinned glass apparatus for generating hydrogen gas from hydrogen sulphide. As shown in FIG. 3B:

Common source of positive (+)direct current voltage (VDC) connects to both Anodes.
Common source of negative (-)direct current voltage (VDC) connects to both Cathodes.
1—Anode; duplicate glass tubes
2—Anode; duplicate aspirator S.S. tubing
3—Cathode; duplicate aspirator S.S. tubing
4—Cathode; duplicate glass tubes
5—pH sensor location below gasket
6—Hand held pH; conductivity and temperature instrument.
7—Duplicate S.S. coiled wire cathode electrodes
8—Duplicate S.S. coiled wire anode electrodes
9—Outlet from flow through conductivity sensor
10—Inlet to flow through conductivity sensor
11—Three ¼" opaque glass panels to maintain plumb and parallel placement of all four glass tubes.
12—Solution temperature probe
13—Sintered S.S. for dispersion and dissolving (bubbles) of hydrogen sulphide.
14—Rubber gasket to seal bath contents with dissolved hydrogen sulphide.

EXAMPLES

The operation of the disclosure is illustrated by the following representative examples. As is apparent to those skilled in the art, many of the details of the examples may be changed while still practicing the disclosure described herein.

Example 1

Generation of Hydrogen Gas from Hydrogen Sulphide

Figure 4:
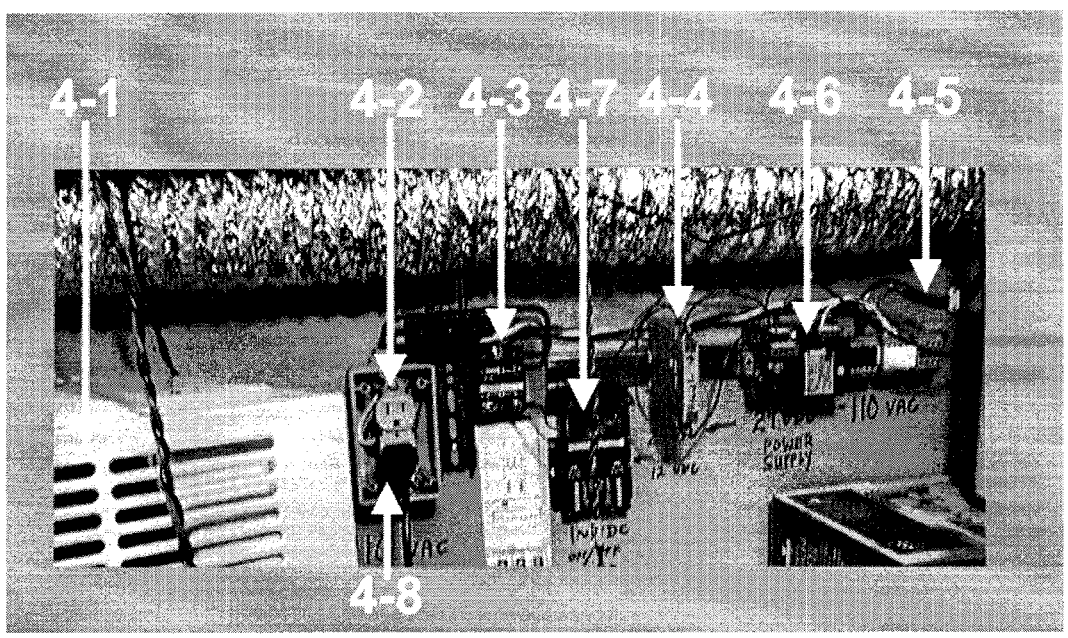
FIG. 4 is a photo showing a cooling water control system to conduct the method of the disclosure.
Figure 5:
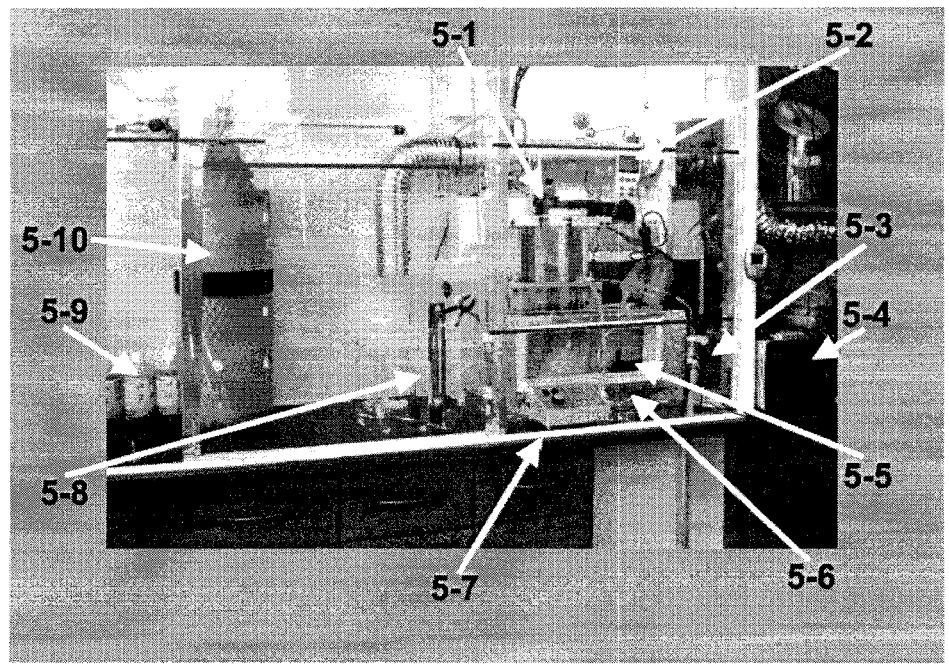
FIG. 5 is a photo showing equipment set-up for conducting a method of the present disclosure.
Figure 6:
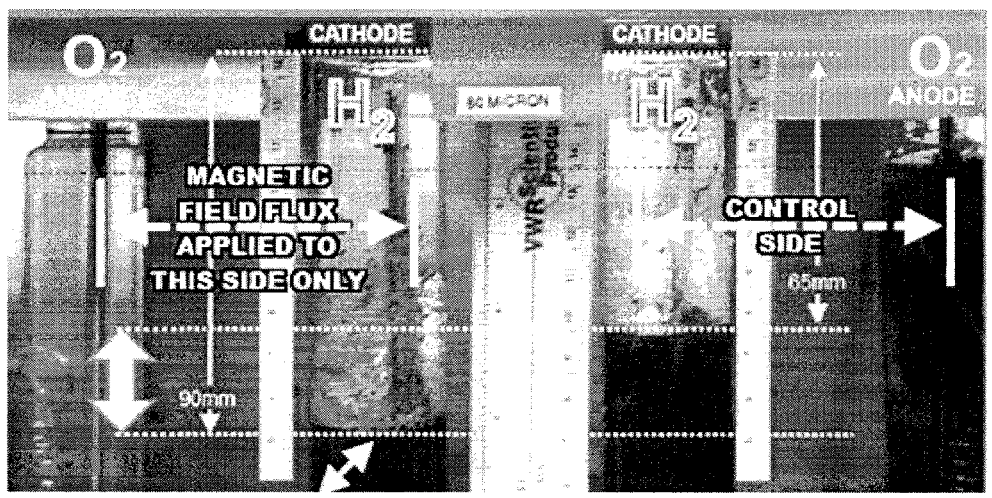
FIG. 6 is a photo showing hydrogen gas product using a method of the disclosure versus a control method.

An insulated chamber of air containing a thin coiled hose (plastic) was cooled. The hose served as a heat exchanger for recycled water. The cooling apparatus is shown in FIG. 4. The cooled water circulated from a glass bath that contained the glass electrolysis apparatus as shown in FIGS. 3A and 3B. When the cooling bath temperature reached 10° C., the regulator of the hydrogen sulphide cylinder allowed sufficient flow through a rotameter. Adjusting the rotameter allowed appropriate sized bubble sparging through the water of the test chamber to facilitate $H_2S$ dissolving and establishing a concentration of $H^+$ and $HS^-$ ions in solution. The entire apparatus is shown in FIG. 5. A control apparatus was also set up which ran adjacent and simultaneously; the only difference was the absence of the influence of a magnetic field flux. When the pH reached 3.30 it confirmed an acidic solution which also registered 12° C. At that point the $H_2S$ flow was terminated. The aspirator pump was started and the tubes were filled above the level of the solution tank until all air was expelled. The tubes were allowed to drain and the filing procedure was repeated four times to affect a flushing and mixing of the solution in the tubes. Prior to starting the experiment the filled tubes were allowed to sit 30 minutes to confirm there were no leaks of air into the tubes. The wait also allowed "Brownian Motion" of the solution contents to get to almost equilibrium before starting the experiment. As shown in FIG. 6 in which a magnetic field flux is applied to the left side (right side is the control), the method of the present disclosure (left side) demonstrated generation of hydrogen gas from hydrogen sulphide higher than the control (38.5% increase).

As shown in FIG. 4 the Cooling Water Control System comprises:
4-1—Air Conditioner Modified to Control;
4-2—Timer Controlled 11 VAC;
4-3—SS Relay 3 to 32 vdc to switch 110 VAC;
4-4—SS24 vdc to 12 vdc;
4-5—110 VAC supply;
4-6—24 vdc power supply;
4-7—12 vdc ss Control (Time on/off);

4-8—110 VAC power supply to AC.

As shown in FIG. 5, the apparatus comprises 5-1—Twinned Glass Tube Electrolysis apparatus with functional section in cooling bath;
5-2—Hand held pH, conductivity and temperature meter;
5-3—Conductivity flow through chamber with probe;
5-4—Temperature controlled cooling chamber containing heat transfer coil from circulating cooling bath;
5-5—circulating pump immersed in cooling bath;
5-6—insulated and double walled glass circulating cooling bath for insertion of glass walled electrolysis vessel;
5-7—peristaltic pump for circulating electrolysis solution through conductivity probe;
5-8—rotameter for hydrogen sulphide sparging;
5-9—4, 7 and 10 pH standards;
5-10—cylinder of hydrogen sulphide.

Prophetic Example 2

Generation of Hydrogen Gas from Hydrogen Sulphide and Separation Using Magnetic Flux Vortex A flowing stream of hydrogen sulphide is subjected to both electrolysis and a magnetic flux so that a vortex array of neodymium magnets will provide sustaining influence along the length of the vortex and thereby facilitate the traverse of ions into a concentrated cross section of the flowing stream ideally in close proximity to both the flux and the (appropriately designed) cathode and anode electrodes. The positive hydrogen ion ($H^+$) transfers its charge to the cathode ($^-$) and joins with another hydrogen ion ($H^+$) to form the hydrogen gas molecule ($H_2$).

The invention claimed is:

1. A method for producing hydrogen gas from aqueous hydrogen sulphide, comprising the steps of:
   providing a source of aqueous hydrogen sulphide;
   subjecting the aqueous hydrogen sulphide to electrolysis thereby producing electrolysis products, wherein the electrolysis products comprise hydrogen gas; and
   subjecting the electrolysis products to a magnetic field to facilitate the separation of the electrolysis products, wherein the magnetic field facilitates the separation of the electrolysis products into three separate streams.

2. The method according to claim 1, wherein the source of aqueous hydrogen sulphide is wastewater, sewage water or seawater.

3. The method according to claim 1, wherein the electrolysis products further comprise hydrogen ions and/or bisulphide ions.

4. The method according to claim 1, wherein the three separate streams comprise a hydrogen species stream, a bisulphide ion stream and a residual aqueous stream.

5. The method according to claim 4, wherein the hydrogen species comprises hydrogen gas ($H_2$).

6. The method according to claim 5, wherein the hydrogen species stream further comprises hydrogen ions ($H+$).

7. The method according to claim 4, wherein the residual aqueous stream is depleted of hydrogen sulphide.

8. The method according to claim 1, wherein the electrolysis of the aqueous hydrogen sulphide and subjecting the electrolysis products to a magnetic field occur concurrently or independently.

9. The method according to claim 1, further providing electrodes for the electrolysis of the aqueous hydrogen sulphide, wherein the electrodes comprises an anode and a cathode.

10. The method according to claim 9, wherein the anode and the cathode are helically or vortically arranged.

11. The method according to claim 9, wherein the anode is helically or vortically arranged and the cathode forms a central longitudinal member disposed within the helically or vortically arranged anode.

12. The method according to claim 10, further providing a helically or vortically arranged magnet, or series of magnets forming a helix or vortex, thereby providing the magnetic field for the separation of the electrolysis products.

13. The method according to claim 12, wherein the helically or vortically arranged anode is disposed within the helically or vortically arranged magnet or series of magnets.

14. The method according to claim 13, further comprising vortically flowing the aqueous hydrogen sulphide through the helically or vortically arranged electrode and the helically or vortically arranged magnet.

15. The method according to claim 9, further comprising applying a direct current across the anode and cathode so as to cause a current flow through the aqueous hydrogen sulphide.

16. The method according to 9, wherein hydrogen gas or hydrogen ions form at the cathode and bisulphide ion forms at the anode.

17. The method according to claim 12, wherein the magnet is a rare earth magnet or an electro-magnet.

18. The method according to claim 4, wherein the bisulphide stream is converted to aqueous hydrogen sulphide and recycled as a source of hydrogen sulphide.

19. The method according to claim 2, wherein the seawater comprises sodium sulphate and is subjected to anaerobic respiration.

* * * * *